Feb. 16, 1965
W. ROTMAN
3,170,158
MULTIPLE BEAM RADAR ANTENNA SYSTEM
Filed May 8, 1963
4 Sheets-Sheet 1
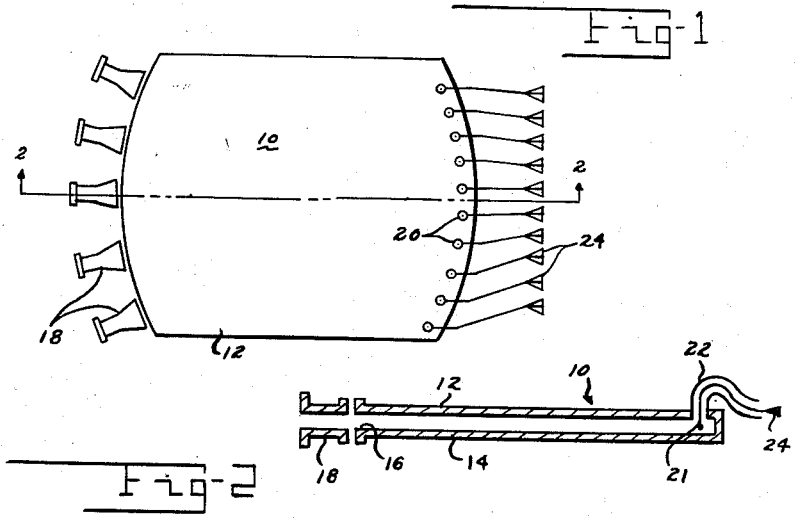
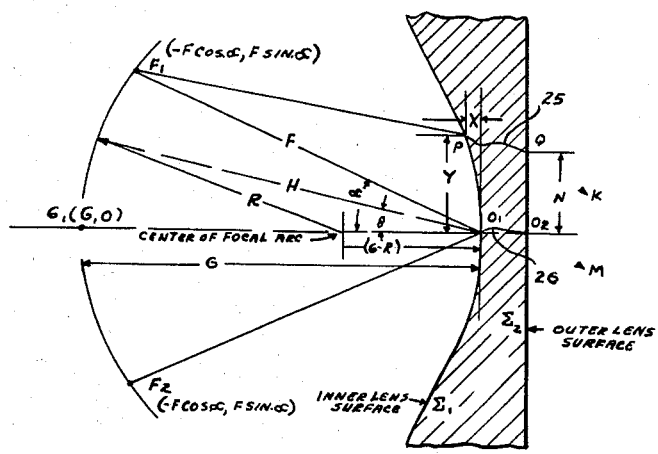
INVENTOR.
WALTER ROTMAN
BY
ATTORNEY Feb. 16, 1965  W. ROTMAN  3,170,158
MULTIPLE BEAM RADAR ANTENNA SYSTEM
Filed May 8, 1963  4 Sheets-Sheet 2

INVENTOR.
WALTER ROTMAN
BY
ATTORNEY

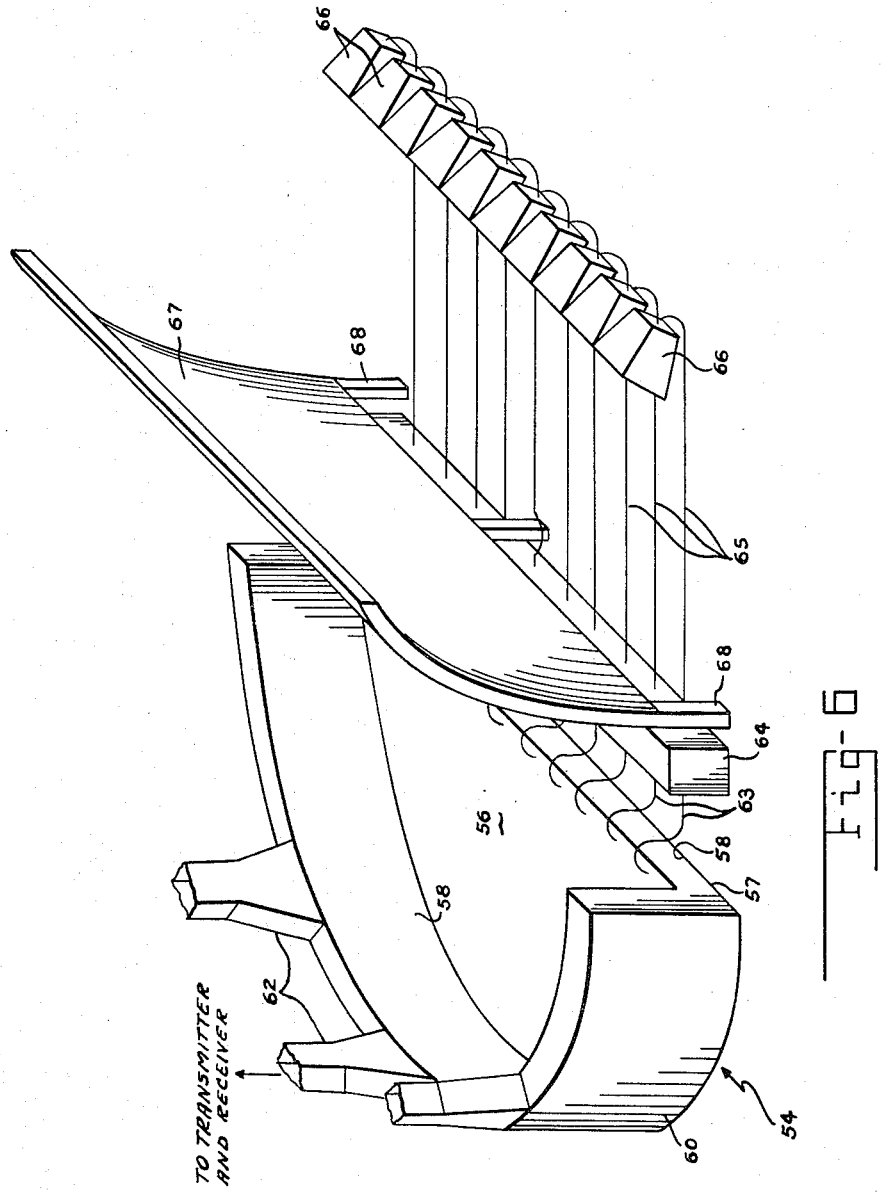

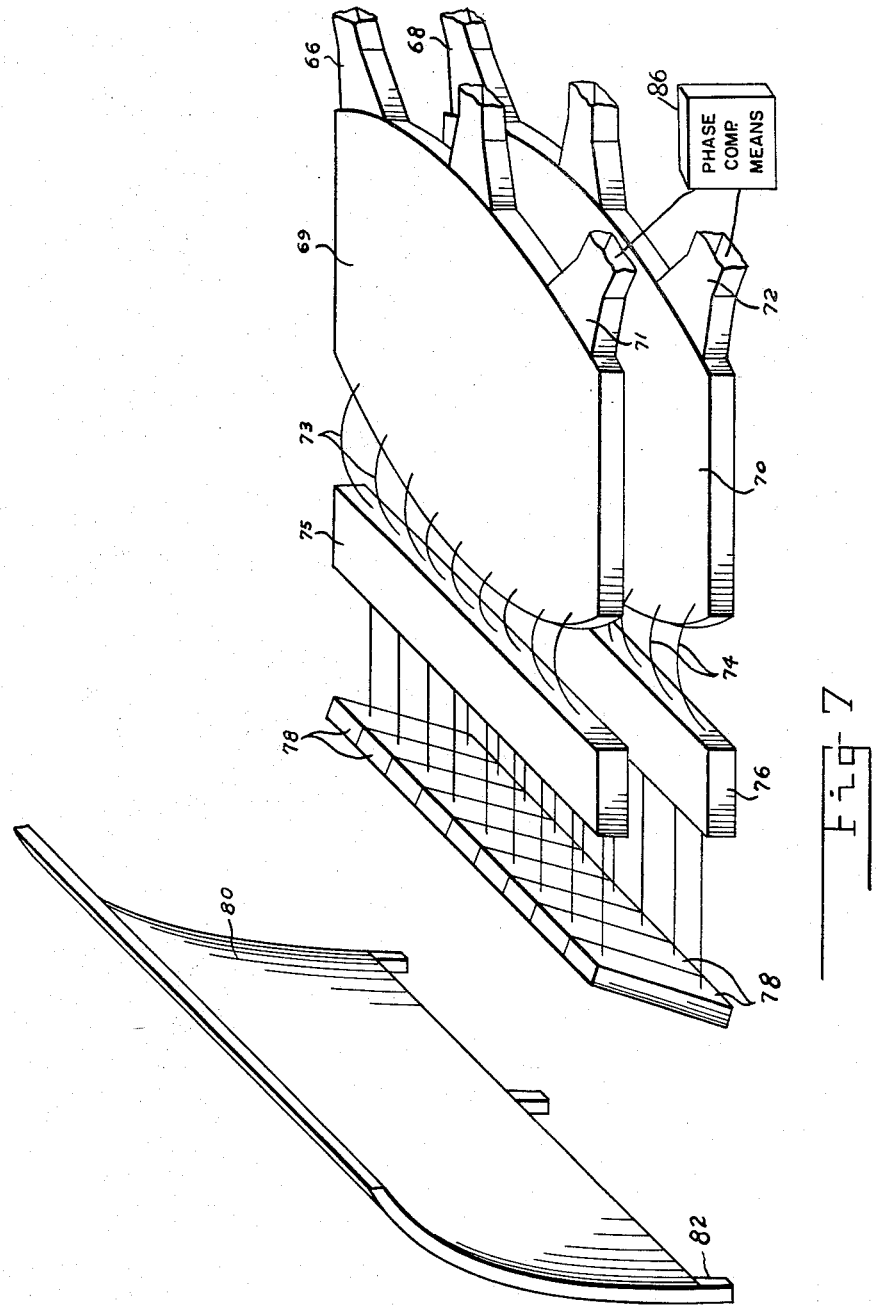

3,170,158
MULTIPLE BEAM RADAR ANTENNA SYSTEM
Walter Rotman, Brighton, Mass., assignor to the United States of America as represented by the Secretary of the Air Force
Filed May 8, 1963, Ser. No. 279,029
9 Claims. (Cl. 343—100)
(Granted under Title 35, U.S. Code (1952), sec. 266)

The invention described herein may be manufactured and used by or for the United States Government for governmental purposes without payment to me of any royalty thereon.

This invention relates to directional antenna systems and relates, particularly, to radar scanning antenna systems in which a sector of air space is scanned by a radar beam from multiple sources for detecting intruder aircraft.

One object of the invention is to provide a radar antenna system in which the comparably large mass of long range antenna structures is avoided.

Another object of the invention is the provision of a radar antenna system in which the reflector illuminated by propagated energy favorably compares in size with reflectors heretofore used.

A further object of the invention is to provide a radar antenna system wherein side lobe depression of the radiation pattern is an improvement over that heretofore accomplished.

A further object of the invention is the provision of a radar antenna system wherein greater scanning speeds may be employed with the resultant improvement of a larger sector scanned.

Yet another object of the invention is the provision of a radar antenna system wherein the peak power requirements are reduced to levels favorable for lengthening the operating life of the system components.

To accomplish the foregoing objects, in a system constructed in accordance with the present invention, a number of waves of electromagnetic energy are generated with discrete angular spacings and scanning is accomplished by varying electrical path lengths encountered by each of the waves in a phase shifter bank. The waves are shifted from their unperturbed paths over an angular interval sufficient to cover the entire field of view assigned for radar coverage. Structural characteristics pertinent to the radar antenna system of the invention include a parallel plate transmission line fed by multiple stationary inputs of electromagnetic energy each of which is capable of generating a beam in a different angular direction, a two-dimensional lens connected to probes which extract energy from the parallel plate region, a bank of phase shifter elements exposed to the input energy whose electrical path lengths can be varied, and a linear array of radiating elements fed individually by the phase shifter elements for radiating the energy into space. The radiating elements achieve a broadside radiation pattern used for illuminating a shaped cylindrical parabolic reflector which narrows the beam in the orthogonal plane.

According to another feature of the invention, the microwave lens formed by the parallel plate transmission line is replaced by a geodesic pillbox having wide angle scanning properties.

An extension of the basic antenna structure embodying the invention to obtain instantaneous height-finding information by phase-comparison techniques forms a third feature of the invention. Here, beams separated from each other by a predetermined angle are emitted simultaneously for the purpose of determining the elevation angle of the intruder aircraft. In such an embodiment, two identical banks of identical phase shifting elements and wide angle lenses are required. The elevation angle of the aircraft detected is determined by phase comparison between corresponding inputs of reflected energy returned to the two lens systems.

Complete understanding of the invention and introduction into other objects and features not specifically mentioned may be had from the following detailed description of several specific embodiments thereof in conjunction with the appended drawings in which:

FIG. 1 is a plan view of the lens arrangement embodied in the radar antenna system of the invention;

FIG. 2 is a view partially in section taken along line 2—2 of FIG. 1;

FIG. 3 is a ray trace diagram showing certain parameters of the lens construction;

FIGS. 6 and 7 illustrate alternative embodiments of the invention employing the basic structure shown in the antenna system of FIG. 1.

Figure 4:
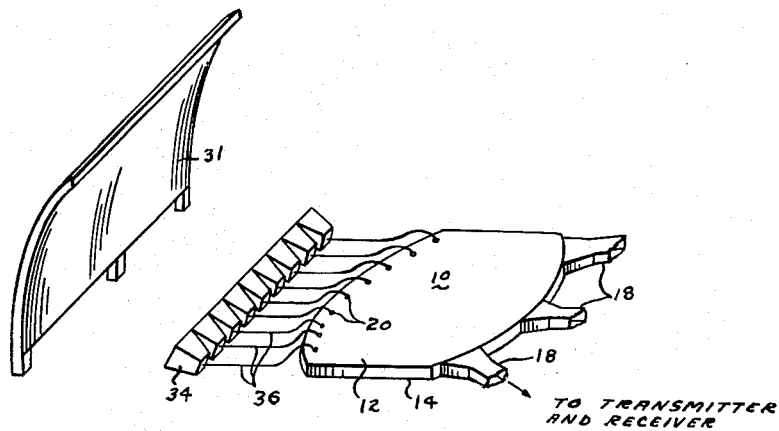
FIG. 4 is a view in perspective showing the lens arrangement of FIG. 1 illuminating a typical reflector.

Referring to the drawings, in which like reference characters refer to like elements in each of the several views, in FIGS. 1 and 2 there is shown one embodiment of a microwave lens radar system constructed according to the invention. Reference character 10 generally designates a parallel plate microwave lens comprising two parallel plates 12 and 14 open at one end to present a feed aperture 16. The lens axis bisects the parallel plates in the longitudinal direction. Microwave radiation from primary horn illuminators 18, located along the aperture 16, propagates between the parallel plates toward pick-off probes 20 disposed adjacent the other end of the parallel plate region. Probes 20 extract the energy from the parallel plate region and feed it into coaxial transmission lines which comprise an inner conductor 21 and an outer conductor 22 electrically common with the parallel plates. The other ends of the coaxial transmission lines connect to a linear array of radiating elements or antennas 24.

The dimensions and spacing of probes 20 must be selected to insure adequate coupling of the lens element to the parallel plate region over a wide range of incident feed angles. In the following formulation of the design equations for the microwave lens, reference is made to FIG. 3 in which parameters unique to the lens construction of the invention are illustrated. In FIG. 3, the lens surfaces are shown two-dimensionally by the cross sections $\Sigma_1$ and $\Sigma_2$. The first contour, $\Sigma_1$, defines the inner lens surface and determines the position of the probe transitions between the parallel plates and the coaxial lines. The second contour, $\Sigma_2$, is the outer lens surface and is defined by the location of the radiating elements that comprise the line source. Corresponding elements on contours $\Sigma_1$ and $\Sigma_2$ are connected by a coaxial transmission line 25. The third contour is the circular focal arc which is selected as a segment of a circle whose center lies on the lens axis and which passes through the on-axis focal point and two symmetrical off-axis points.

A point on the contour $\Sigma_1$ is defined by the two coordinates (X, Y) that are measured relative to the vertex of the lens at $O_1$. Points on the straight contour $\Sigma_2$ are similarly determined by the single coordinate N, measured relative to the point $O_2$ on the axis. The points $O_1$ and $O_2$ lie on contours $\Sigma_1$ and $\Sigma_2$ respectively and are connected by a coaxial transmission line 26 of electrical length $W_0$. The point P, defined by the coordinates X and Y, is a typical probe element in $\Sigma_1$ and is connected to point Q, which lies on $\Sigma_2$ and is defined by the coordinate N, by the transmission line 25 of electrical length W. The three quantities X, Y, and W can be chosen at will; thus this straight-front-face lens has three degrees of freedom.

Actual values for the three degrees of freedom will now be selected to obtain wide-angle scanning characteristics. These design parameters include (FIG. 3) two symmetrical off-axis focal points, $F_1$ and $F_2$, and one on-axis focal point, $G_1$, having coordinates ($-F \cos \alpha$, $F \sin \alpha$), ($-F \cos \alpha$, $-F \sin \alpha$), and (G, O) respectively relative to the point $O_1$. A ray through the lens at the origin is represented by $F_1 O_1 O_2 M$ and $F_1 PQK$ represents any other typical ray.

The lens is now designed so that the three focal points $F_1$, $F_2$, and $G_1$ give perfectly collimated beams of radiation at angles to the axis of $-\alpha$, $+\alpha$, and $0°$ respectively.

Equations for the optical path-length conditions for path-length equality between a general ray and the ray through the origin are:

$$(F_1 P) + W + N \sin \alpha = F + W_0 \quad (1)$$
$$(F_2 P) + W - N \sin \alpha = F + W_0 \quad (2)$$

and $$(G_1 P) + W = G + W_0 \quad (3)$$

where $$(F_1 P)^2 = F^2 + X^2 + Y^2 + 2FX \cos \alpha - 2FY \sin \alpha \quad (1a)$$
$$(F_2 P)^2 = F^2 + X^2 + Y^2 + 2FX \cos \alpha + 2FY \sin \alpha \quad (2a)$$

and $$(G_1 P)^2 = (G + X)^2 + Y^2$$

$F_1 P$, $F_2 P$, and $G_1 P$ represent path lengths from focal points $F_1$, $F_2$, and G respectively to the inner surface of the lens.

Normalizing relative to the focal length F defines a new set of parameters:

$$\rho = N/F, \ x = X/F, \ y = Y/F$$

$$w = \frac{W - w_0}{F}, \ g = G/F$$

Also $$a_0 = \cos \alpha, \ b_0 = \sin \alpha$$

Equations 1a to 3a may then be written:

$$\frac{(F_1 X)^2}{F^2} = 1 + x^2 + y^2 + 2a_0 x - 2b_0 y \quad (1b)$$

$$\frac{(F_2 P)^2}{F^2} = 1 + x^2 + y^2 + 2a_0 x - 2b_0 y \quad (2b)$$

and $$\frac{(G_1 P)^2}{F^2} = (g + x)^2 + y^2 \quad (3b)$$

Combining the normalized Equations 1 and 1b $$\frac{(F_1 P)^2}{F^2} = (1 - w - b_0 \rho)^2$$

$$= 1 + w^2 + b_0^2 \rho^2 - 2b_0 \rho + 2b_0 w \rho - 2w \quad (1c)$$

$$= 1 + x^2 + y^2 + 2a_0 x - 2b_0 y$$

Since the off-axis focal points are symmetrically located, the lens surfaces must also be symmetrical about the center axis. This means that, if $\rho$ is replaced by $-\rho$ and $y$ by $-y$, Equation 1c remains unchanged. Equation 1c can therefore be separated into two independent equations; one contains only odd powers of $y$ and $\rho$ while the other contains the remaining terms. Thus, $$-2b_0 \rho + 2b_0 w \rho = -2b_0 y$$

or $$y = \rho(1 - w) \quad (4)$$

Also $$x^2 + y^2 + 2a_0 x = w^2 + b_0^2 \rho^2 - 2w \quad (5)$$

Equations 3 and 3b, relating to the on-axis focus, may likewise be written:

$$\frac{(G_1 P)^2}{F^2} = (g - w)^2 = (g + x)^2 + y^2 \quad (3c)$$

or $$x^2 + y^2 + 2gx = w^2 - 2gw \quad (6)$$

Equations 5 and 6 can be combined to give the following relation between $w$ and $\rho$:

$$aw^2 + bw + c = 0 \quad (7)$$

where $$a = \left[1 - \rho^2 - \left(\frac{g-1}{g-a_0}\right)^2\right]$$

$$b = \left[2g\left(\frac{g-1}{g-a_0}\right) - \frac{(g-1)}{(g-a_0)^2} b_0^2 \rho^2 + 2\rho^2\right]$$

$$c = \left[\frac{g b_0^2 \rho^2}{g - a_0} - \frac{b_0^4 \rho^4}{4(g - a_0)^2} - \rho^2\right]$$

Equation 7 is a quadratic equation in $w$ whose solution is:

$$w = \frac{-b + \sqrt{b^2 - 4ac}}{2a}$$

This completes the solution for the lens design. For fixed values of $\alpha$ and $g$, $w$ can be computed as a function of $\rho$ from Equation 7. These values of $w$ and $\rho$ may then be substituted into Equations 4 and 6 to determine $x$ and $y$ and complete the specification of the lens dimensions.

The design procedure, as outlined hereinabove, gives a lens which has three perfect focal points corresponding to the angles $\pm\alpha$ and $0°$. For wide angle scanning the focusing ability of the lens must be acceptable not only at these three points but also at intermediate angles along some focal arc. In order to illustrate how further to minimize the overall phase aberrations it is helpful to consider parameter $g$ in greater detail. It will be recalled that $g$ is the ratio of on-axis focal length G to off-axis focal length F. For the special case of a straight face at the outer surface of the lens, as is shown herein, the criterion relied on is that minimum coma and overall phase error is obtained by defocusing the feed from the assumed focal arc by an amount equal to $\frac{1}{2}(\alpha^2 - \theta^2)F$, where $\theta$ is the intermediate angle at which correction is desired. With this defocusing the residual aberrations are quite small and the lens can scan a narrow beam over wide angles. The optimum value of $g$ for aberration reduction equals $$1 + \frac{\alpha^2}{2}$$

The focal arc is now selected as a segment of a circle of radius R, whose center lies on the lens axis and which passes through the two symmetrical off-axis points $F_1$ and $F_2$ and the one on-axis focal point $G_1$. The phase error from any point on this focal arc (expressed as the difference in path length between the central ray and any other ray) may be shown to be:

$$\Delta l = \frac{\Delta L}{F} = (h^2 + x^2 + y^2 + 2hx \cos \theta - 2hy$$

$$\sin \theta)^{1/2} - h + w + \rho \sin \theta \quad (9)$$

where $\Delta L$ = path length error,
$h = H/F$ = normalized distance from point on focal arc to origin $O_1$ of surface $\Sigma_1$. H is determined from the triangle with sides R, H, and G−R and with included angle $\theta$ (FIG. 3).
$\theta$ = angle between central axis and point on focal arc.
R = radius of focal arc (determined by the three points G, $F_1$, and $F_2$ on the arc).

As an illustrative example the equation will be applied to obtain numerical solutions pertaining to the lens design. A total scan angle, $2\alpha$, between the off-axis points $F_1$ and $F_2$ is selected as $60°$. The following parameters are immediately determined:

$$\alpha = 30°$$
$$a_0 = \cos \alpha = 0.8660$$
$$b_0 = \sin \alpha = 0.5$$
$$g = 1 + \frac{(\cos \alpha)^2}{2} = 1.137$$

Substituting these values in the relations of Equation 7 gives in terms of $\rho$:

$$a = 0.7444 - \rho^2$$
$$b = 1.1496 + 1.5335\rho^2$$
$$c = 0.0490\rho^2 - 0.2128\rho^4$$

Representative values of $x$, $y$, and $w$ computed from Equations 4, 6 and 7 as a function of $\rho$, and over a range $.75 > \rho > 0$ with an interval of 0.1, are given in the following tabulation:

| $\rho$ | $y$ | $x$ | $w$ |
|---|---|---|---|
| 0.0 | 0.0000 | −0.0000 | +0.0000 |
| 0.1 | 0.1000 | −0.0048 | +0.0004 |
| 0.2 | 0.1996 | −0.0192 | +0.0015 |
| 0.3 | 0.2992 | −0.0429 | +0.0027 |
| 0.4 | 0.3989 | −0.0752 | +0.0027 |
| 0.5 | 0.5007 | −0.1146 | −0.0014 |
| 0.6 | 0.6103 | −0.1574 | −0.0172 |
| 0.7 | 0.7486 | −0.1910 | −0.0694 |
| 0.75 | 0.8539 | −0.1894 | −0.1386 |

The radius R of the focal arc for a lens of $g=1.137$ has the dimensions of 0.597F and its origin on the axis is 0.5403F from the vertex $O_1$.

From Equation 9, the path length phase error $\Delta l$ can be determined for various values of the scan angle $\theta$. It will be understood that for $\theta = 0°$ and $\pm 30°$, $\Delta l$ is zero. The following two tables are tabulations of the path length phase error $\Delta l$ for $\theta = \pm 10°, \pm 15°, \pm 20°,$ and $\pm 25°$ and $g = 1.137$.

| $\rho$ | $\theta = -10°$ | $\theta = -15°$ | $\theta = -20°$ | $\theta = -25°$ |
|---|---|---|---|---|
| 0.1 | −0.0000 | −0.0000 | 0.0000 | 0.0000 |
| 0.2 | −0.0000 | −0.0000 | −0.0000 | −0.0000 |
| 0.3 | −0.0000 | −0.0000 | −0.0000 | −0.0000 |
| 0.4 | −0.0000 | −0.0000 | −0.0000 | −0.0000 |
| 0.5 | 0.0000 | 0.0000 | 0.0000 | 0.0000 |
| 0.6 | 0.0001 | 0.0001 | 0.0001 | 0.0001 |
| 0.7 | 0.0007 | 0.0008 | 0.0007 | 0.0005 |
| 0.75 | 0.0014 | 0.0017 | 0.0016 | 0.0010 |

| $\rho$ | $\theta = 10°$ | $\theta = 15°$ | $\theta = 20°$ | $\theta = 25°$ |
|---|---|---|---|---|
| 0.1 | 0.0000 | 0.0000 | 0.0000 | 0.0000 |
| 0.2 | 0.0000 | 0.0000 | 0.0000 | 0.0000 |
| 0.3 | 0.0000 | 0.0000 | 0.0000 | 0.0000 |
| 0.4 | 0.0000 | 0.0000 | 0.0000 | 0.0000 |
| 0.5 | −0.0000 | −0.0000 | −0.0000 | −0.0000 |
| 0.6 | −0.0002 | −0.0003 | −0.0003 | −0.0002 |
| 0.7 | −0.0010 | −0.0014 | −0.0015 | −0.0012 |
| 0.75 | −0.0020 | −0.0028 | −0.0031 | −0.0024 |

Since the directivity of each horn illuminator 18 is a function of its positions along the focal arc relative to the lens axis, the dimensions of each horn and its orientation depends on its position. Also, the peak of radiation need not, in general, be in the direction of the vertex of the lens. Thus, for different directions in space the angular movements of various beams usually will not be identical for a given amount of phase shift. Accordingly, to derive the equations for the shift in beam position and to determine the location of the feeds to obtain complete coverage of the field of view, let the following notations be assumed:

$\theta_n$ = angular position of $n$th feed in the lens relative to the lens axis.

$\phi_n$ = angular position in space of radiated beam from $n$th feed.

$d_\lambda$ = spacing of radiating elements in linear arrays, expressed in wavelengths.

$\delta_\lambda$ = additional phase shift in wavelengths artificially introduced between adjacent radiating elements.

For $\delta_\lambda = 0$, the angular positions of the beams, $\phi_n$, corresponds to that of the feeds, $\theta_n$. The problem may now be restated: Given N feeds, determine their angular position $\theta_n$ and the amount of phase shift $\delta_\lambda$ in order to cover a field of view extending from $\phi_1$ to $\phi_{N+1}$.

With no phase shift ($\delta_\lambda = 0$) a feed at location $\theta_n$ produces a beam whose direction $\phi_n$ is also $\theta_n$. The phase difference in wavelengths between adjacent radiating elements, spaced a distance $d_\lambda$ apart is then $d_\lambda \sin \theta_n$.

Let us now assume that an additional phase shift $\delta_\lambda$ is introduced by adding a phase shifter between the output ends of the coaxial transmission lines and the array of radiating elements to which they attach. The beam moves to a new position given by:

$$\sin \phi_n = \sin \theta_n + \frac{\delta_\lambda}{d_\lambda}$$

or $$\phi_n = \sin^{-1}\left[\sin \theta_n + \frac{\delta_\lambda}{d_\lambda}\right] \quad (10)$$

Each beam must move from its position $\theta_n$ to position $\theta_{n+1}$ in order to obtain complete scanning coverage. Hence, $$\phi_{n(max)} = \theta_{n+1} \quad (11)$$

or $$\theta_{n+1} = \sin^{-1}\left[\sin \theta_n + \frac{\delta_\lambda^{max}}{d_\lambda}\right]$$

Likewise:

$$\theta_{N+1} = \sin^{-1}\left[\sin \theta_N + \frac{\delta_\lambda^{max}}{d_\lambda}\right]$$

By induction:

$$\theta_{N+1} = \sin^{-1}\left[\sin \theta_1 + N\frac{\delta_\lambda^{max}}{d_\lambda}\right] \quad (12)$$

The required phase shift is given by:

$$\frac{\delta_\lambda^{max}}{d_\lambda} = \frac{\sin \theta_{N+1} - \sin \theta_1}{N} \quad (13)$$

And the position of the $n$th feed is at:

$$\theta_n = \sin^{-1}\left[\sin \theta_1 + \frac{n-1}{N}(\sin \theta_{N+1} - \sin \theta_1)\right] \quad (14)$$

$$= \sin^{-1}\left[\frac{n-1}{N}\sin \theta_{N+1} + \left(\frac{N-n+1}{N}\right)\sin \theta_1\right]$$

Equations 13 and 14 determine the required maximum phase shift and the position of the feeds, respectively, while Equation 10 can be used to calibrate intermediate positions of the beam.

In the microwave lens radar system shown in FIGS. 1 and 2, the radiation pattern from the array of radiators is, in a practical sense, much too broad to be directly propagated into space for large range detection purposes. Accordingly, as shown in FIG. 4, a parabolic cylindrical reflector for collimating the beam in elevation may be employed. As appears in FIG. 4, a parallel plate transmission line 10, identical to the construction shown in FIG. 1, comprises a pair of parallel plates 12 and 14 and is fed at one end by input horns 18 having connections to suitable transmitting and receiving translating apparatus. At the other end of the plates are pick-off probes 20 spaced from each other on opposite sides of the lens axis in accordance with the equations set forth hereinabove. A linear array of radiators 34 receives its energy from the pick-off probes through suitable coaxial transmission lines 36.

In transmission, input sources (not shown) connected to horns 18 emit waves of electromagnetic energy which is directed into the aperture of the parallel plates, with the path of each beam after leaving the radiators 34 being determined by the position of the horn illuminator which generates it. Microwave energy taken by the pick-off probes from the parallel plate region is conveyed over coaxial transmission lines 36 to illuminate a parabolic cylindrical reflector 31. The shape of reflector 31 is to narrow the beam in the orthogonal plane. The systems of FIGS. 1, 2 and 4 will, of course, include suitable means leading from the feed horns to use energy returned from detected intruder objects for determining pertinent tracking information.

Figure 5:
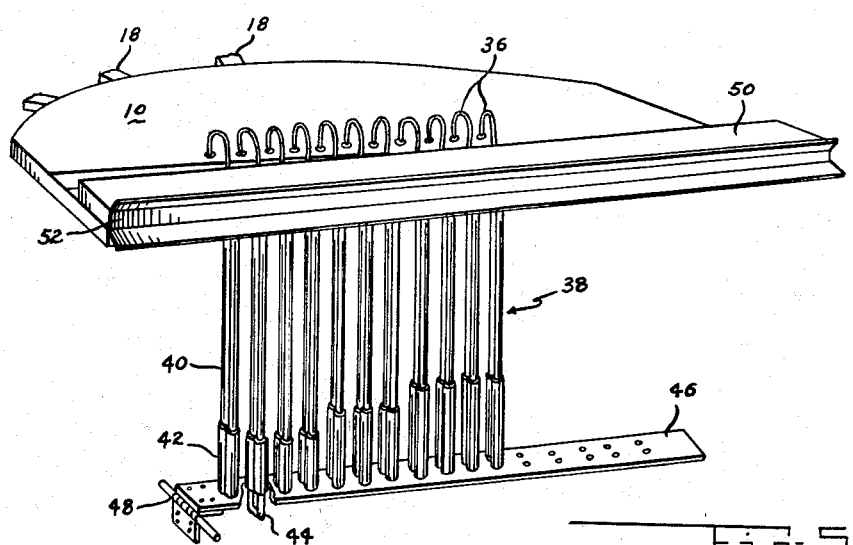
FIG. 5 is a perspective view essentially of FIG. 1 with phase shifting means inserted.

In the above description of the parallel plate microwave lens it was noted that beams from the radiating elements are radiated in different fixed directions corresponding to the orientation of the feed horns. FIG. 5 shows an arrangement, in accordance with the invention for scanning the multiple beams. In FIG. 5 a parallel plate microwave lens system corresponding essentially to the system identified by FIG 1 is modified by inserting in series with the coaxial transmisison lines 36, a phase shifter generally indicated at 38 which introduces a linearly progressing phase shift between successive lines. The trombone type phase shifter is acceptable for use in the present invention and, as herein shown, each phase shifter comprises upper and lower portions 40 and 42, respectively, of telescoping tubing whose adjustment relative to each other changes the path length of the individual phase shifter. The two halves of each lower section 42 are joined by a U-shaped connector 44, only one being shown for simplicity, which fixedly connects each lower section to a bar 46. The angle of bar 46 relative to a fixed plane is made adjustable by virtue of a hinge connection 48 at one end of the bar. A single aperture elongated horn 50 forms the radiator. The electrical wave conducing path between the output end of each coaxial transmission line 36 and the aperture 52 of horn 50 is traced downwardly through one of the halves of the section 40 and through the lower section 42 and thence upwardly through the other half by section 40 to aperture 52.

In operation, when microwave energy is applied to horn illuminators 18, passage of the energy to the aperture of radiator 50 produces angularly related multiple beams. Moving bar 46 about point 48 causes an adjustment in the length of each phase shifter and a proportionate phase shift of the energy conveyed by each phase shifter. The progressive phase shift as the bar moves causes the desired scanning of the beams by angularly shifting the position of the main lobe of the radiation pattern resulting from each beam. For ease in illustration, a reflector illuminated by the scanning beams is not shown. Moreover, a suitable mechanism coupled to bar 46 for achieving the scanning requirements will readily occur to those skilled in the art and hence is not shown. The lower section of each phase shifter is initially adjusted to assure a scan of each beam of several degrees over a limited sector of space. Thus, as the wave energy of each beam encounters the phase shifter elements it will be swept over a limited sector sufficiently to cause overlapping of the undeflected azimuthal directions of the respective beams. It will thus be understood that the entire field of view may be covered by several independent beams each of which covers only a portion of the region under surveillance. It has been shown that the gain of an array of radiating elements when arranged in the manner of the invention remains fairly constant during the transitions of the beams over the assigned sector and that the shape of the radiation pattern resists deterioration even at relatively large angles of deflection.

A principal advantage of the reflector-lens combination shown in the arrangement of FIGS. 1 and 2 and the modified version of FIG. 5 is the almost complete lack of aberrations. For a scan angle of ± 30° computations show that the aberrations are nonexistent to three significant figures when the focal length is normalized to unity. Expressed in terms of the practical benefits secured, the entire aperture of the parallel plate lens and the line source of radiating elements feeding the reflector may be used to collimate the beam A typical lens-reflector installation constructed according to the embodiments shown and using a fixed directional reflector may have the following parameters:

Scan angle _____ ±30°
Beam width _____ 1° x 1°
Line source _____ 190 ft. long
Parabolic reflector _____ 210 ft. long x 160 ft. high Aside from having exceptional wide angle scanning properties, the antenna systems of the invention has the definite advantage of longer service life. This follows by employing several transmitters each operating on a relatively low power lever rather than using a single transmitter unit having high power requirements. Consequently, problems are eased in the case of fabrication, installation and maintenance of the transmitters. Also reduced considerably is the steady deterioration of system components felt ordinarily under high power conditions of single transmitter systems. For the same total average power and phase shifting performance, each of the horns of the line source of a single transmitter system must be capable of withstanding higher breakdown voltages than for a multiple beam system of the type embodying the invention. The total R.M.S. voltage (given by the square root of the sum of the square of the voltages produced by the individual transmitters) is thus lower in each part of a multiple beam system than in a single beam system. It follows that a given component in the antenna system of the instant invention can handle a higher average power level for the multiple transmitter system if breakdown voltage is the limiting factor.

The use of a multiple beam arrangement also tends to reduce the scanning loss which ordinarily occurs in a single transmitter system. Losses in single transmitter systems are due to movement of the beam during scanning before the reflected pulse from the target returns to the receiver. The scanning loss is a function of the scan rate of the antenna and, also, is related to the distance to the target. In the multiple beam system of the present invention, each beam is able to move more slowly to obtain a given frame scan rate. Conversely, the frame rate can be increased for a given scanning loss.

Recent calculations have shown that lenses may be designed with $\alpha = \pm 45°$ for a total useful scan angle of between 90° and 100°. The 60° sector lens was selected for illustrative purposes and is not intended to represent a limiting case. This feature of the invention is embodied in the arrangement of FIG. 6. In FIG. 6, a geodesic pillbox wave conducting medium referenced 54 consists of two semicircular parallel plates 56 and 57 of different diameter open along the diameter edges thereof to present an aperture 58 of constant height. Mounted on the curved edges of plates 56 and 57 and of corresponding diameter are semi-circular geodesic pillbox surfaces 58 and 60 which together enclose a curved linearly spaced region extending downwardly to communicate with the space between the parallel plates. Energy due to an applied electric field from a suitable microwave power source is propagated between plates 56 and 57 by means of input feed horns 62 supported in spaced relation on the rim joining surfaces 58 and 60. The aforementioned construction thus affords multiple sources of radiation each capable of emitting a beam in a specified direction between plates 56 and 57. In the most simple terms, the design of the pillbox 54 is based upon the wide angle scanning properties of a semicircular reflector combined with vertical geodesic contours for the purpose of reducing spherical aberration. While the type of geodesic pillbox contemplated for use in the arrangement of FIG. 6 has much less spherical aberration than a nongeodesic system, the aberrations which occur are still too great to permit formation of beams as narrow as 1° efficiently. Accordingly, collimated energy appearing at the output layer of geodesic pillbox 54 due to the influence of an applied electric field is extracted by a series of closely spaced pick-off lines 63 located along the diameter of the lens. Energy thus removed by the lines 63 is led to a bank of phase shifters 64 composed of a plurality of individual phase shifters each connected to receive the input from one of the pick-off probes. The output of the bank of phase shifters 64 is fed by means of transmission cables 65 to a linear array of horn radiators 66 which comprise a line source for a cylindrical parabolic reflector 67 supported by suitable posts 68. The relative phase delay produced by the phase shifters serves to scan the individual beams, which illuminate the reflector 67, in the manner previously explained for the microwave lens design.

The physical dimensions of the antenna system embodied in the FIG. 6 arrangement are almost identical to those of the flat parallel plate lens systems hereinabove described with the exception that the total scan angle achievable is about 100° instead of 60°. By placing the parabolic reflector between the array of radiators and the pillbox care is taken that the radiation pattern from the reflector 67 is directed away from the pillbox itself since the considerable height of the vertical surfaces 58 and 60 could cause shadowing. No significant shadowing occurs in the radar antenna system of the invention using the parallel plate lens because of the flat surfaces involved.

Since in radar applications it is desired to scan a narrow beam over a wide angular region, the cylindrical parabolic reflector illustrated in connection with each of the previously described embodiments more than adequately serves this purpose. Thus, in practical arrangements, line sources suitable to illuminate a cylindrical parabolic reflector or other suitable lens will ordinarily be employed.

Also in accordance with a feature of the invention, FIG. 7 discloses a multiple beam radar antenna for determining instantaneous solutions to the height of an intruder aircraft entering an assigned area by comparing the phase of return echoes from the target as received at the terminals of two identical parallel plate lenses. Thus, as shown in FIG. 7, the principle of the parallel plate lens and parabolic reflector previously discussed in connection with FIGS. 4 and 5 is retained and extended to obtain the height finding function. It is assumed in the following discussion that the intruder aircraft is illuminated by some suitable microwave radar transmitter and that the radar antenna of FIG. 7 is used for reception only. The transmitted radiation can be obtained either from a separate and synchronized antenna system or by time-sharing and switching portions of the receiving antenna system of FIG. 7 for transmission purposes.

Microwave energy which is reflected from the intruder aircraft will be incident upon the cylindrical parabolic reflector 80, shown in FIG. 7, in the form of a plane wave whose angle of incidence is dependent upon the elevation of the target aircraft. This radiation is focused along a line upon the waveguide array composed of a plurality of two-terminal slotted waveguides 78 which are located along the focal arc of the cylindrical reflector 80. The position along the slotted waveguides 78 at which the energy is focused is a function of the angle of incidence of the incoming radiation and of, hence, target elevation.

For simplicity in illustration, the waveguides 78 are herein shown diagrammatically since their exact form is not material to the invention; a slotted waveguide which could be used in FIG. 7 is shown in Radiation Laboratory Series, vol. 12, pages 287 and 296. Briefly, a slotted waveguide of the type considered constitutes a series of equi-spaced slotted radiative elements and a supporting waveguide transmission line. The microwave radiation from the cylindrical reflector 80 enters the waveguide 78 principally through a single one of the slot radiators whose position is determined by the elevation angle of the target. This microwave energy propagates in both directions within the waveguide 78 and arrives at its two terminals with a relative time delay or phase-shift which is dependent upon the position of the illuminated slot. This relative difference in phase between the signals at the two terminals can be interpreted in terms of the elevation angle of the target aircraft and is preserved through the remainder of the antenna system.

In FIG. 7, two identical parallel plate lenses 69 and 70 are superimposed in parallel relation to receive the microwave energy from the two terminals of the waveguide array 78 after passage through identical and synchronized banks 75 and 76 of phase shifter elements by means of transmission cables 73 and 74. The manner of operation of the lenses and phase shifters has been described hereinabove and will not be repeated. Thus, the microwave energy which is reflected from the target aircraft is received at an appropriate set of feed horns 71 and 72 and at a period during the scan cycle which is determined by the azimuthal position of the target. Suitable receiver equipment 86 for instant phase determination is connected between feed horns 71 and 72 and give appropriate outputs for elevation determination. Simplification of target identification and trajectory prediction follows from the phase comparision method of heigh finding.

In the several embodiments of the invention shown, the spacing of the pick-off probes and the radiating elements included in each antenna array should be close enough together to prevent secondary beams from occurring; for the range of angles desired, a spacing of about 0.65λ is satisfactory, where λ is the wavelength of the operating frequency. Moreover, to obtain complete coverage of the assigned field of view in each embodiment of the antenna system described hereinabove, it is noted that the total phase shift required of each phase shifting unit is only $1/N$ of that necesary to scan a single beam over the entire field, where N equals the number of feed horns.

It will be apparent to those skilled in the art that changes and modifications of the several embodiments of the invention illustrated and described may be made therein without departing from the spirit of the invention or the scope of the appended claims.

I claim:

1. A radar antenna system comprising, a parallel plate wave conducting lens having a feed aperture, multiple beam producing means for launching a plurality of wave energy beams separated angularly from each other relative to the lens axis into the aperture of said lens, a linear array of radiating elements, and multiple phase shifter means receiving the energy propagating within said lens and coupled in energy conducting relation to said array of radiating elements for linearly altering the phase shift of the energy input into said array thereby to scan the radiated energy through a predetermined space.

2. In combination, a parallel plate lens at one end having a curved aperture symmetrical on each side of the lens axis, point sources of wave energy differently angularly related to the lens axis for illuminating said aperture, probe means coupled to the opposite end of said lens for extracting wave energy propagating therein, a linear array of radiatiang elements, and phase shift means connected to said array receiving the energy so extracted by said probe means for synchronously changing the velocity of said energy whereby each beam emanating from said radiating elements scans through a preselected fraction of a predetermined space.

3. A radar antenna system comprising a parallel plate lens which consists of two parallel plates having symmetrically formed ends at which focal arcs having a center on the lens axis are formed, said plates having a feed aperture at one end thereof, multiple input sources of wave energy coupled to said plates to communicate with said aperture, each of said sources generating a beam directed in a different angular direction relative to the lens axis, probe means coupled to said plates for extracting energy propagating between said plates, a linear array of radiators oriented to deliver a narrow-beam pattern in space, and phase shift means interconnecting said probe means and said array of radiators for introducing a linearly increasing phase shift in the phase of the energy transferred from said lens to said array.

4. A radar antenna system comprising two parallel plates forming a parallel plate lens having a feed aperture at one end thereof, symmetrical focal arc surfaces formed at both ends of said plate with the centers thereof falling on the lens axis, plural sources of electromagnetic energy located adjacent said aperture at regular intervals apart and directing into said aperture multiple beams of wave energy angularly related to the lens axis, an array of radiating elements linearly arranged to form a line source of radiation, plural phase shifters each connected to one of said radiating elements according to a predetermined pattern and being so phased that wave energy received by said phase shifters emanates from said radiating elements as multiple beams scanning through a predetermined angle, and probe means coupled to the opposite end of said plates for extracting wave energy from said lens and conveying the energy so extracted to said phase shifters.

5. A radar antenna system comprising a parallel plate lens including spaced parallel plates closed at one end and having a curved aperture at the opposite end of a curvature defined by the focal arc of the lens, multiple stationary means having different angular positions relative to the lens axis for individually applying wave signals into said aperture, probe means coupled to the closed end of said lens for extracting therefrom energy of said wave signals, said probe means each comprising a coaxial cable having an inner conductor conveying the energy so extracted to a point external to said lens and an outer conductor in electrical contact with said plates, a plurality of phase shift elements, a linear array of radiating elements disposed to present a narrow-beam pattern in spaced upon excitation thereof, and means for connecting each of said phase shift elements between one of said radiating elements and one of the inner conductors of said coaxial cables and said phase shift elements being so adjusted as to excite said radiating elements in proper phase to scan simultaneously multiple beams through a predetermined space.

6. A radar antenna system as claimed in claim 5 wherein a reflector for narrowing an incident beam in the orthogonal plane is illuminated by the beam emanating from said array of radiating elements.

7. A radar antenna system as claimed in claim 6 wherein said reflector is a cylindrical parabolic section.

8. A radar antenna system comprising a geodesic pillbox including two semicircular parallel plates of different diameter open along the diameter edge thereof to present an aperture of constant height and two semicircular geodesic surfaces mounted on the curved edges of said parallel plates to enclose a curved linearly spaced region communicating with the space between said plates, means for injecting wave energy between said geodesic surfaces so as to illuminate said aperture with collimated energy, a plurality of closely spaced probes coupled to said pillbox along the diameter of said plates, a plurality of phase shifting devices, coaxial cables for connecting each of said probes to one of the phase shifting devices, a plurality of radiating elements each fed by one of said phase shifting devices and said radiating elements being disposed in a linear array to present a broadside pattern of radiation, and a cylindrical parabolic reflector disposed for illumination by the energy emanating from said radiating elements, said phase shifters each introducing a linear phase shift between the pillbox and said array of radiators whereby the resulting radiation reflected from said reflector scans through a predetermined space.

9. A radar antenna system for determining the height and other spatial coordinates of an intruder aircraft entering the space designed for radar coverage comprising: a cylindrical parabolic reflector disposed to receive reflected wave energy when target aircraft is illuminated by an external transmitting source, a plurality of two-terminal slotted-waveguide units upon which the energy received by said reflector is focused, the focal position depending upon elevation of target aircraft, each waveguide unit including multiple superposed slots, said slots being so oriented that upon reception of waves from said cylindrical reflector signals are available at the two terminals of each waveguide unit with a relative phase relation which corresponds to the elevation angle of target aircraft, two banks of phase shifter units, each phase shifter being connected to one terminal of said slotted waveguide unit, said banks of phase shifter units each introducing a linear phase shift and corresponding angular shift in wavefront of received signals from said slotted waveguide unit for determining azimuthal position of target aircraft, two superposed parallel plate lenses disposed in parallel relation with electrically separate probe means connected to one end thereof for extracting wave energy which propagates through said phase shifter units, the opposite end of said lenses having a feed aperture of constant height for reception of incoming signals by individual horn means, and receiver means also coupled between said horn means for comparing the relative phase of reflected energy returned from said aircraft through said antenna system whereby the height of said aircraft may be determined.

References Cited by the Examiner

UNITED STATES PATENTS

| | | | |
|---|---|---|---|
| 2,566,703 | 9/51 | Iams | 343—100 |
| 2,736,894 | 2/56 | Kock | 343—911 |
| 3,016,531 | 1/62 | Tomiyasu et al. | 343—122 |

CHESTER L. JUSTUS, *Primary Examiner.*